United States Patent Office 3,000,962
Patented Sept. 19, 1961

3,000,962
PREPARATION OF TRIALKYLBORINES
Mack W. Hunt, Ponca City, Okla., assignor to Continental Oil Company, Ponca City, Okla., a corporation of Delaware
No Drawing. Filed Aug. 3, 1959, Ser. No. 831,035
12 Claims. (Cl. 260—606.5)

This invention relates to a method for the production of organo-boron compounds and more particularly to the preparation of trialkylborines.

Trialkylborines are well known chemical compounds, and several methods for their preparation have been suggested heretofore. For example, it has been proposed that trialkylborines can be prepared by reacting a dialkyl-zinc compound with ethyl borate. In another method these compounds have been prepared by reacting an alkylmagnesium halide with methyl borate. A more general method has involved the reaction of a suitable Grignard reagent with boron fluoride in the form of the boron fluoride-ethyl ether complex. It has also been suggested that these compounds can be prepared by the interaction of alkylaluminum dihalides or dialkylaluminum halides or a mixture of the two with a boron halide either as such or in the form of a boron halide complex. In another proposed process an alkyl borate ester is reacted with an alkyl halide in the presence of metallic aluminum. Although trialkylborines can be produced by any of the foregoing methods these methods are not entirely satisfactory. As for example, dialkylzinc compounds, Grignard, and similar reagents are expensive and furthermore are not readily available. In other processes the yields have been relatively low.

It is therefore, a principal object of the present invention to provide a process which obviates the disadvantages of the prior art processes.

It is another object of my invention to provide a process for the production of trialkylborines without the use of spontaneously inflammable solvents or reactants. It is another object of this invention to provide a process for the production of these compounds at relatively low temperatures. Other objects and advantages of my invention will become apparent as the invention is hereinafter more thoroughly disclosed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

The foregoing objects and advantages are attained by a process which may be described in brief as follows: An alkyl borate ester is reacted with an alkylaluminum halide or a dialkylaluminum halide after which the desired product is recovered from the reaction mass by distillation.

The reactions may be expressed equationwise as follows:

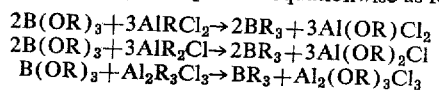

In carrying out the reaction, the relative proportion of the borate ester and the alkyl aluminum halide may be varied widely. Preferably, however, the ratio of the two reactants is used in the amounts as shown by the equation. By employing the reactants in that ratio the yields obtained have approached theoretical.

Before proceeding with specific examples illustrating my invention, it may be well to indicate in general the nature of the materials required in the process.

Suitable borate esters are those identified by the general formula: $B(OR)_3$ wherein R is an alkyl radical containing from 1 to 10 carbon atoms. Preferred esters are those in which the alkyl radical contains from 1 to 4 carbon atoms.

Suitable halides for use in my invention are those identified by the general formulas: $RAlX_2$, $R_2AlX$, and $R_3Al_2X_3$ wherein R is an alkyl radical containing from 1 to 28 but preferably 1 to 5 carbon atoms. The symbol X represents a halide radical, such as chloride, fluoride, or bromide. Because of their greater availability I prefer the chlorides.

As to the temperature at which the reaction is carried out, that may vary from about 20 to 100° C. I prefer to operate, however, through a more limited range; namely, 75 to 95° C.

In order to disclose the nature of the present invention still more clearly, the following illustrative examples will be given. It is to be understood that the invention is not to be limited to the specific conditions or details set forth in these examples except insofar as such limitations are specified in the appended claims. In the examples, parts given are parts by weight.

Example 1

A reaction vessel equipped with a thermometer, condenser, agitator and means for adding either reactant slowly was charged with 17.6 parts of diethylaluminum chloride. 22.4 parts of triisobutyl borate was then added to the reaction vessel while the contents were stirred.

During the addition of the ester the temperature of the contents in the reaction vessel increased quickly from room temperature to 90° C. After all the ester had been added the reaction mixture was heated to reflux and 8.7 parts of triethylborine was obtained which represented a 91.2 percent yield.

Example 2

The process of Example 1 was repeated with the exception that 13.4 parts of dimethylaluminum chloride was substituted for the 17.6 parts of diethylaluminum chloride used in Example 1. An excellent yield of trimethylborine was obtained.

Example 3

In this example a 3-necked flask equipped with a dropping funnel, thermometer, and distillation head was charged with 51.3 parts by weight of $Al_2Cl_3(C_2H_5)_3$. 47.6 parts by weight of $B(i-OC_4H_9)_3$ were added to the above over one hour, maintaining the temperature at 60° C. by the heat of reaction. After the addition, the reaction mixture was heated to reflux and the product was collected between 95 and 99° C. This procedure gave 20 parts by weight of boron triethyl or 51% yield.

Example 4

In this example a 3-necked flask equipped with a dropping funnel, thermometer, and distillation head was charged with 53.6 parts by weight of $AlCl_2(C_2H_5)$. 26.3 parts by weight of $B(i-OC_3H_7)_3$ was added to the above over one hour period maintaining the temperature at 90° C. by the heat of reaction. After the addition, the boron triethyl was collected between 95 and 97° C. This procedure gave 4.6 parts by weight of boron triethyl or 45% yield.

Additional examples were run in which an equivalent amount of dibutylaluminum chloride and dipropylaluminum chloride on a molar basis was substituted for the diethylaluminum chloride used in Example 1. In each case excellent yields of the corresponding trialkylborine were obtained.

Similar results were obtained when other borate esters were substituted for the triisobutyl borate used in Example 1. Specific esters used included trimethyl borate, triethylborate, and tripropyl borate. In each example an equivalent amount of each ester on a molar basis was used.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. The method of preparing a trialkylborine which comprises reacting an alkyl borate ester with an alkyl aluminum chloride at a temperature of about 20 to 100° C., wherein the alkyl groups of said borate ester and said chloride contain from 1 to 10 and 1 to 28 carbon atoms respectively.

2. The method of preparing a trialkylborine which comprises reacting an alkyl borate ester with an alkyl aluminum chloride at a temperature of about 20 to 100° C., wherein the alkyl groups of said borate ester and said chloride contain from 1 to 4 and 1 to 5 carbon atoms respectively.

3. The method of claim 1 wherein the reaction is carried out at a temperature varying from 75 to 95° C.

4. The method of claim 1 wherein the alkyl borate ester is triisobutyl borate.

5. The method of claim 1 wherein the alkyl borate ester is trimethyl borate.

6. The method of claim 1 wherein the alkyl borate ester is triethyl borate.

7. The method of claim 1 wherein the alkyl borate ester is tripropyl borate.

8. The method of preparing a trialkylborine which comprises reacting an alkyl borate ester with diethylaluminum chloride at a temperature of about 20 to 100° C., wherein the alkyl groups of said borate ester contain from 1 to 10 carbon atoms.

9. The method of preparing a trialkylborine which comprises reacting an alkyl borate ester with dimethylaluminum chloride at a temperature of about 20 to 100° C., wherein the alkyl groups of said borate ester contain from 1 to 10 carbon atoms.

10. The method of preparing a trialkylborine which comprises reacting an alkyl borate ester with dibutylaluminum chloride at a temperature of about 20 to 100° C., wherein the alkyl groups of said borate ester contain from 1 to 10 carbon atoms.

11. The method of preparing a trialkylborine which comprises reacting an alkyl borate ester with dispropylaluminum chloride at a temperature of about 20 to 100° C., wherein the alkyl groups of said borate ester contain from 1 to 10 carbon atoms.

12. The method of preparing a trialkylborine which comprises reacting an alkyl borate ester with ethylaluminum dichloride at a temperature of about 20 to 100° C., wherein the alkyl groups of said borate ester contain from 1 to 10 carbon atoms.

References Cited in the file of this patent

UNITED STATES PATENTS 2,840,590   Muetterties _____ June 24, 1958

OTHER REFERENCES

Grosse et al.: J. Organic Chem., vol. 5, pp. 106 to 121 (1940). (Copy in Scientific Library.)